(12) United States Patent
Mattarella-Micke

(10) Patent No.: US 11,610,113 B2
(45) Date of Patent: Mar. 21, 2023

(54) SYSTEM AND METHOD FOR UNDERSTANDING QUESTIONS OF USERS OF A DATA MANAGEMENT SYSTEM

(71) Applicant: Intuit Inc., Mountain View, CA (US)

(72) Inventor: Andrew Mattarella-Micke, Menlo Park, CA (US)

(73) Assignee: Intuit Inc., Mountain View, CA (US)

( * ) Notice: Subject to any disclaimer, the term of this patent is extended or adjusted under 35 U.S.C. 154(b) by 752 days.

(21) Appl. No.: 16/660,330

(22) Filed: Oct. 22, 2019

(65) Prior Publication Data

US 2021/0117777 A1 Apr. 22, 2021

(51) Int. Cl.
*G06N 3/08* (2023.01)
*G06N 3/04* (2023.01)
*G06F 16/248* (2019.01)
*G06N 3/02* (2006.01)

(52) U.S. Cl.
CPC ............ *G06N 3/08* (2013.01); *G06F 16/248* (2019.01); *G06N 3/02* (2013.01); *G06N 3/04* (2013.01)

(58) Field of Classification Search
CPC ... G06N 3/08; G06N 3/02; G06N 3/04; G06F 16/248; G06F 16/3344; G06F 16/3347; G06F 40/20; G06F 16/90332
USPC ......... 706/20, 25, 45, 55; 707/751, 748, 728
See application file for complete search history.

(56) References Cited

U.S. PATENT DOCUMENTS

| 11,194,973 | B1 * | 12/2021 | Goel | G06F 40/289 |
| 2019/0043379 | A1 * | 2/2019 | Yuan | G06N 3/0445 |
| 2020/0401885 | A1 * | 12/2020 | Hewitt | G06F 11/302 |

* cited by examiner

*Primary Examiner* — Evan Aspinwall
(74) *Attorney, Agent, or Firm* — Paradice & Li LLP

(57) ABSTRACT

A data management system trains an analysis model with a machine learning process to understand the semantic meaning of queries received from users of the data management system. The machine learning process includes retrieving assistance documents that each include a query and an answer to the query. A training model analyzes each answer and generates first topic distribution data indicating, for each answer, how relevant each of a plurality of topics is to the answer. The queries are passed to the analysis model and the analysis model is trained to generate second topic distribution data that converges with the first topic distribution data based on analysis of the queries.

20 Claims, 4 Drawing Sheets

SYSTEM AND METHOD FOR UNDERSTANDING QUESTIONS OF USERS OF A DATA MANAGEMENT SYSTEM

BACKGROUND

Millions of people turn to electronic data management systems for assistance in managing various kinds of data. Electronic data management systems represent a potentially efficient and convenient way to manage data of many kinds. For example, millions of people turn to data management systems for assistance with tax return preparation, bookkeeping, accounting, and transaction monitoring.

Users of data management systems often develop questions regarding features of the data management systems or related to data management topics. Data management systems typically enable users to call or otherwise contact support agents to receive assistance in resolving their questions. However, this process can be expensive for the data management systems and time consuming for users. For example, when users call to speak with a support agent, if there happens to be a high volume of calls, then some users may have to wait to speak to the support agent. This can be frustrating to users.

In order to reduce the volume of calls to support agents, some data management systems have sought to utilize automated support systems to help users resolve their concerns. For example, some traditional data management systems provide a library of assistance documents that include explanations or assistance related to various data management topics. Some data management systems also utilize automated chat systems to help users resolve their questions.

However, these automated support systems can only help users if they can determine the correct meaning of the questions asked by the users. When a user enters a search query to search among the library of assistance documents, if the search system does not understand the meaning of the query, then the system will not be able to return search results that adequately resolve the user's question or concern. Likewise, if an automated chat system does not correctly understand the meaning of a user's question, then the automated chat system will not be able to respond with helpful information to resolve the user's question or concern.

Efforts have been made to utilize machine learning models to understand text provided by users. Typically, text based machine learning models utilize one hot encoding that represents the presence or absence of a particular word in a text. However, one hot encoding is limited by a sparse, high dimensional nature. Additionally, one hot encoding does not encode semantic relationships between words.

Recent approaches to text representation have employed neural networks to build dense representations based either on unsupervised regularities or large corpuses of data labeled for general semantic similarity. While these approaches provide a dense, semantically organized representation, those representations encode universal meaning, which cannot capture highly directed interactions such as a customer support dialogue.

Accordingly, traditional data management systems continue to provide inefficient customer self-help. When data management systems are not able to identify and address the exact types of questions that continue to drive customer support calls and customer searches among assistance topics databases, both the data management system and the users can face adverse consequences. Users continue to search among assistance documents and call customer support agents, thereby causing the data management systems to spend large amounts of human and computing resources, such as processor cycles, memory, and time performing searches for assistance topics.

All of these drawbacks are a result of the technical inability of the traditional data management systems to properly understand the meaning user questions and search queries. Accordingly, there exists a technical problem of accurately understanding questions and text provided by users.

What is needed is a system and method that can provide a technical solution to the technical problem of accurately understanding the meaning of questions and other text provided by users.

SUMMARY

A data management system utilizes automated systems to understand the meaning of questions and other text provided by users. The data management system then provides information to the users based on the meaning of the question or text. In this way, the data management system efficiently and effectively helps users to resolve their questions and concerns.

The data management system utilizes a combination of machine learning techniques to understanding the meaning of user questions. A training model analyzes answers provided for previous user queries and generates initial topic distribution data for the answers. The initial topic distribution data is then used as labels for training an analysis model. During the training process, the analysis model receives the user queries and the labels. The analysis model is trained with a machine learning process to analyze the text of the queries rather than the text of the answers to the queries and to generate a topic distribution that matches the initial topic distribution based on the text of the queries.

The analysis model is a query analysis model. In particular, in the course of generating topic distribution data, the analysis model generates embedding data that embeds each query in a vector space. The analysis model is sensitive to the sequences of words in the queries. Accordingly, the analysis model embeds the queries based not only on the words in the queries, but on the sequence of words in the queries.

Once the analysis model has been trained, new user queries can be provided to the analysis model. The analysis model can embed the new user queries in the vector space. The embeddings can be utilized to determine the true meaning of the user queries. The data management system can provide relevant assistance to the users in response to the queries based on the embeddings.

Figure 1:
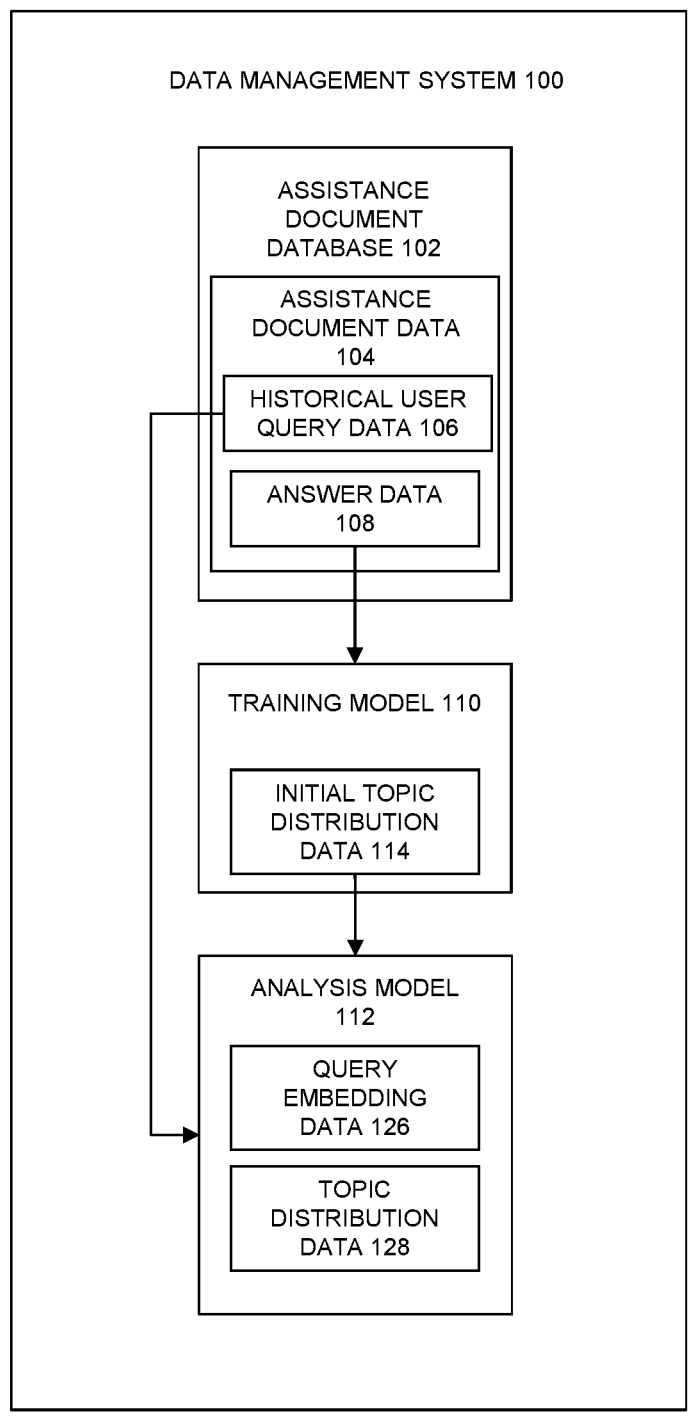
FIG. 1 illustrates a functional block diagram of a in data management system during

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Embodiments of the present disclosure utilize a combination of models to accurately determine the meanings of user queries. A training model generates initial topic distribution data identifying a distribution of topics that are relevant to the query based on answers given to the queries. The initial topic distribution data is used to train an analysis model to replicate the initial topic distribution data based on the text of the queries rather than the text of the answers. The analysis model is sensitive not only to the words in the queries, but to the sequences of words in the queries. The analysis model embeds the queries in a vector space based on the sequences of words in the queries. After the analysis model has been trained, the data management system utilizes the analysis model to generate vector or matrix embeddings for new user queries. The vector or matrix embeddings indicate the meanings of the queries. The data management system provides relevant assistance to the users responsive to the queries based on the vector embeddings.

FIG. 1 is a functional block diagram of a data management system 100 during a process for training an analysis model to understand the semantic meaning of user queries, according to an embodiment. Users of a data management system, such as a tax return preparation system, sometimes have questions or concerns regarding aspects of the data management system. The users provide queries to automated systems, such as assistance document search systems and assistance chat bots.

The data management system 100 includes an assistance document database 102. The assistance document database stores assistance document data 104 including a plurality of assistance documents. The assistance document data 104 includes historical user query data 106 and answer data 108. In particular, each assistance document includes a historical user query and an answer or explanation for the historical user query.

The historical user queries can include questions provided by historical users of the data management system 100. The questions are related to aspects of the function of data management system or to aspects of the data management domain for which the data management system 100 provides data management services.

In an example in which the data management system 100 is a tax return preparation system, the data management domain is the tax domain. The historical user queries can include questions generic to the tax domain and/or to the particular functions and capabilities of the tax return preparation system. The data management system 100 can provide data management services for the data management domains other than the tax domain. For example, the data management system can provide data management services for personal financial management, budgeting, accounting, bookkeeping, and many other types of data management.

The answer to a historical user query can include an explanation or resolution to the question of the user. The answer may include a large amount of text in comparison to the query. Each answer may address several topics, depending on the query. This is because a single question may involve a complex answer that touches on multiple aspects of the tax domain and/or the particular functionality of the data management system 100.

Although the following discussion focuses primarily on assistance documents that include a query and an answer, in practice an assistance document may include a subject line rather than a query. The answer may include a conversation between a user of the data management system 100 and an expert associated with the data management system 100 that addresses the subject or query. The answer may also include a conversation between a user that provided the query or subject and a more experienced user that has the knowledge to resolve the first user's query or concern. The following discussion will describe analysis of user queries; however, the analysis of user queries can include analysis of subject lines associated with assistance documents or systems conversations in addition to actual queries.

The data management system 100 includes a first training model 110 and an analysis model 112. The first training model 110 is utilized to help train the analysis model 112.

During the training process, the data management system 100 provides the answer data 108 for a large number of assistance documents from the assistance document database 102. The first training model 110 generates initial topic distribution data 114 by analyzing the answers provided in response to historical user queries. In particular, the training model generates, for each answer or explanation, initial topic distribution data 114. The initial topic distribution data 114 for an answer indicates how related that answer is to each of a plurality of topics.

Prior to implementing the training model, the data management system 100 models each of a plurality of topics as sparse distributions over words. For each topic, each word from a database of words is assigned a weight or score indicating how relevant that word is to the topic. The higher the weight or score, the more relevant that word is to the topic. In this way, each topic is modeled as a distribution of words.

Each answer or explanation related to a historical query is treated as a bag of words. The bag of words indicates each word that occurs in the answer or explanation. The bag of words can also indicate the number of times that each word occurs in the answer or explanation.

The first training model 110 generates the initial topic distribution data 114 for each answer or explanation based on the cooccurrence of words in the answer or explanation. If there are pairs or groups of words that cooccur in a given answer or explanation that are each of particular relevance to a topic, then the topic distribution will indicate that the answer or explanation is of particular relevance to that topic. Accordingly, the cooccurrence of words of particular relevance to topics. Topics that are more related to an answer or explanation will have higher scores in the initial topic distribution data associated with that answer or explanation. Topics that are less related to an answer or explanation will have lower scores in the initial topic distribution data associated with that answer or explanation.

In one example, the data management system is a tax return preparation system. Some of the topics for the topic distribution data can include deductions, dependents, particular tax forms, account maintenance, password reset, and many others. The initial topic distribution data indicates, for each answer or explanation, how relevant each topic is to that answer or explanation.

The first training model 110 can include a latent Dirichlet allocation (LDA) model. The LDA model generates topic distribution data based on an assumption that an answer or explanation is of particular relevance to only a small set of topics. The LDA model also operates under the assumption that each topic uses only a small set of words frequently. The result is that the LDA model has improved disambiguation of words and more precise assignment to topics than other natural language processing models. The first training model 110 can utilize other natural language processing models without departing from the scope of the present disclosure.

The data management system 100 generates training set data including the historical user query data 106 and the initial topic distribution data 114. In the training set data, the initial topic distribution data 114 for each answer or explanation is linked to the historical user query for which the answer or explanation was provided. Accordingly, the training set data does not include the answers and explanations. Instead, the training set data includes the queries for which the answers or explanations were provided. The training set data also includes the initial topic distribution data associated with each query.

The data management system 100 trains, with a machine learning process, the analysis model 112 to generate topic distribution data 128 using the training set data. The machine learning process trains the analysis model to generate topic distribution data for each historical user query. In particular, the machine learning process trains the analysis model to generate, for each historical user query, topic distribution data that matches the initial topic distribution data associated with the historical user query.

The analysis model 112 differs from the first training model 110 in that the analysis model 112 during only analyzes the historical user queries in the training process. The analysis model 112 also differs from the first training model 110 in that the analysis model 112 is sensitive to the sequence of the words in the text of the historical user queries. The first training model 110 generates initial topic distribution data 114 based only on the words that occur in the answers and not on the sequence of those words. The analysis model 112 generates topic distribution data based not only on the words included in the historical user requires, but on the sequence of the words included in the historical user queries.

While the exact order of sentences might vary widely from answer to answer, even when discussing similar questions, the sequence information contained in an initiating question is very important for its underlying meaning. For example, the statement "I need help adding a transaction for fixing a solar panel problem" is different from the statement "I need help fixing a problem transaction for adding a solar panel". These statements should receive different numerical embeddings to represent distinct meaning and content. Therefore, the analysis model 112 is sensitive to the sequence of words used in a query.

The machine learning process trains the analysis model 112 to generate topic distribution data 128 that matches the initial topic distribution data 114. However, the desired output of the analysis model 112 is query embedding data 126. In particular, the process of generating topic distribution data 128 includes generating, for each historical user query, a matrix embedding that represents the historical user query in a vector space. The matrix embedding for a historical user query represents the semantic meaning of the historical user query. Training the analysis model 112 to generate topic distribution data that matches the initial topic distribution data is a way to ensure that the vector embeddings are based not only on the words of the historical user query, but on the answers or explanations for the historical user query.

The analysis model 112 can utilize a sequential neural model. The sequential neural model can include a sequence sensitive model such as a long short-term memory (LSTM) model, a gated recurrent unit (GRU), a convoluted neural network (CNN) model, or other suitable sequence sensitive models. These models provide an order sensitive dense embedding of the historical user query.

Input into the analysis model 112 is the ordered list of words in a historical user query vectorized into a one hot encoding. The one hot encoding utilizes, for each word in the historical user query, a sparse vector that represents that particular word. Each one hot encoding vector includes a number of data values corresponding to the number of catalogs words. Accordingly, each one hot encoding vector can be tens of thousands of values in length.

The analysis model 112 receives the series of one hot encoding vectors and generates a matrix of dense vectors. The matrix of dense vectors is an encoding that represents the historical user query. In one example, the matrix of dense vectors is a 300×300 matrix. Other sizes of matrices can be used without departing from the scope of the present disclosure. The query embedding data 126 includes the matrix embedding for each historical user query.

The embedding matrix for a particular sequence is transformed through a series of neural layers until a final output is generated. The final output is the topic distribution data 128 for the corresponding query. The machine learning process compares the distribution of topics to the initial distribution of topics for the corresponding answer or explanation. Differences between the initial topic distribution data 114 and the topic distribution data 128 can be measured via a divergence function such as K-L divergence or Wasserstein distance. These differences are back propagated to the embedding matrix. The weights that produce the embedded matrix are adjusted iteratively until the embedding matrix results in topic distribution data 128 that converges with the initial topic distribution data 114. The result is that queries that yield similar answers are embedded similarly.

The machine learning process for training the analysis model 112 can be a semi-supervised machine learning process. The machine learning process is semi-supervised because the labels are generated by the first training model 110 and may or may not be accurate. Typically, true labels are hand selected and are known to be correct. Accordingly, the machine learning process can considered be a semi-supervised machine learning process. Alternatively, the machine learning process can be a truly supervised machine learning process.

The semi-supervised machine learning process can teach the analysis model 112 that words such as "add", "create", and "input" can be semantically similar without relying on naïve word cooccurrence is within the questions, as would be the case in word2vec models or unlabeled LDA. Rather than learning topic representation from the question itself, the meaning encoded by the question embedding is informed by the answer or explanation that would result from the question.

The topic-question pairing approach overcomes some challenges for domain specific sentence embedding. For example, the analysis model 112 does not require a large corpus of domain specific labeled data. Additionally, analysis model 112 learns domain specific action-driven relationships that other unsupervised methods do not. For example, in the example of the tax return preparation system, W-2 and 1099-INT have the same word cooccurrence relationship in sentences "help with W-2 form" and "help with 1099-INT form". However, these lead to very different conversation topics. Furthermore, dense embeddings have a clear interpretation. They can be roughly related to an underlying topic distribution. Finally, in addition to these advantages, because the analysis model 112 can include a neural network, this approach can benefit from the advantages of other neural approaches such as pretraining with unsupervised algorithms or incorporating a joint loss function.

As will be described in more detail below, after the analysis model has been trained, the analysis model can be used to improve automated customer support processes. For example, new user queries can be provided to the analysis model. The analysis model can generate an embedded matrix representing the query. The true meaning of the new query can be obtained from the embedded matrix.

The initial topic distribution data 114 can be considered first initial topic distribution data. The topic distribution data 128 can be considered second topic distribution data.

Figure 2:
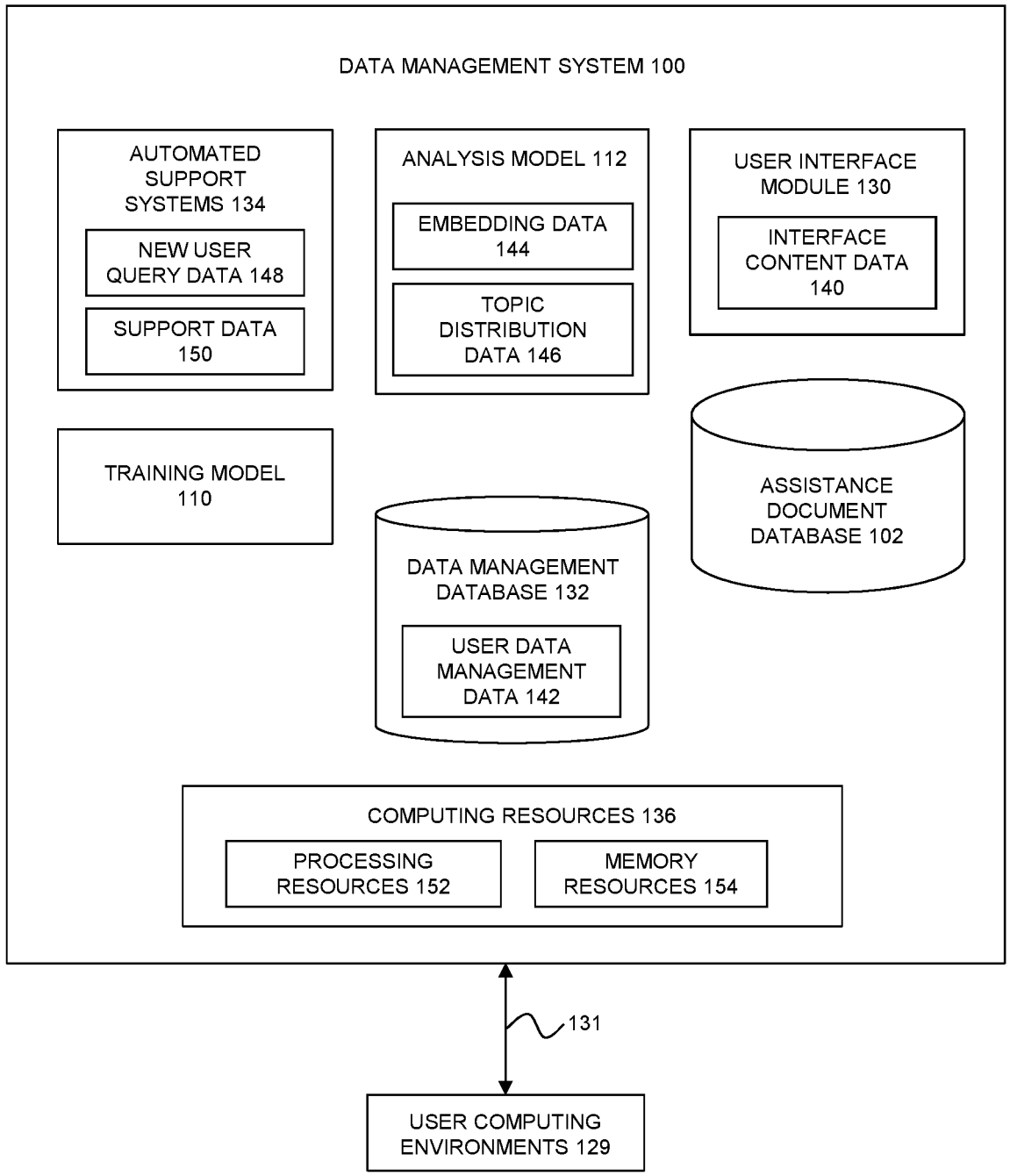
FIG. 2 is a block diagram of a data management system, according to an embodiment.

FIG. 2 is a block diagram of a data management system 100, according to an embodiment. The data management system 100 is an electronic data management system that assists users to manage their data. The data management system 100 can include one or more of a bookkeeping system, a tax return preparation system, an accounting system, and a financial transaction monitoring system, according to various embodiments. Users provide their data to the data management system and the data management system provides data management services to the users. The data management system 100 includes a user interface module 130, a user data management database 132, an assistance document database 102, a training model 110, an analysis model 112, automated support systems 134, and computing resources 136.

The user computing environments 129 correspond to computing environments of the various users of the data management system 100. The users of the data management system 100 utilize the user computing environments 129 to interact with the data management system 100. The users of the data management system 100 can use the user computing environments 129 to provide data to the data management system 100 and to receive data and services, including data management services, from the data management system 100.

The user interface module 130 enables the users to communicate with the data management system 100. The user interface module 130 provides interface content data 140 to assist the user in managing the user's data. The interface content data 140 can include navigation menus and other graphical user interface (GUI) tools that enable the user to navigate the data management system 100 in order to receive data management services. The interface content data 140 can include data management data related to the user. Thus, the user interface module 130 enables the data management system 100 to provide data management services to the user.

The data management system 100 includes a user data management database 132. The user data management database 132 includes the user data management data 142. The user data management data 142 can include data management data for all of the users of the data management system. Thus, the user data management database 132 can include a vast amount of data related to the data management services provided to users. In one embodiment, when the user utilizes the user interface module 130 to view interface content data 140, the interface content data 140 includes user data management data 142 related to the user as retrieved from the user data management database 132.

As described previously, 1 hile using the data management system 100, some users may have questions or concerns regarding aspects of the data management system. The questions or concerns can be related to particular functions of the data management system 100. The questions and concerns can also be related to the specific data management field associated with the data management system 100. For example, if the data management system 100 is a tax return preparation system, some of the users' questions may be related to tax law or the meaning of tax terms.

The data management system 100 utilizes the automated support systems 134 to assist users in resolving their questions or concerns. The automated support systems 134 can enable users to input new user query data 148. The new user query data 148 can include questions, statements, search terms, or other text indicating data management topics about which they would like more information. The new user query data 148 can also include audible statements or questions that the data management system 100 can convert the text using speech recognition systems.

When the automated support systems 134 receive new user query data 148, before the automated support systems 134 can provide answers or assistance to the users, the automated support systems 134 will attempt to understand the semantic meeting of the new user queries. If the automated support systems 134 do not correctly understand the semantic meaning of the new user queries, then it is unlikely that the automated support systems 134 can provide helpful and meaningful answers or information to the users.

The data management system 100 uses the analysis model 112 to understand the semantic meanings of the new user queries. As described in relation to FIG. 1, the analysis model 112 has been trained to analyze user queries and to generate matrix embeddings that represent the semantic meaning of the queries. The data management system 100 utilizes the trained analysis model 112 to understand the semantic meaning of the new user queries.

The user query data 148 including a new user query, the new user query is passed to the analysis model 112. The analysis model 112 analyzes the new user query in the same way as described in relation to FIG. 1. In particular, the new user query is converted to a series of vectors in which each vector is a one hot encoding of one of the words in the user query. The series of vectors is fed into the analysis model 112. The analysis model 112 generates an embedding data 144. The embedding data 144 includes a dense matrix embedding that represents the semantic meaning of the query.

The analysis model 112 can pass in the embedding data 144 to the automated support systems 134. The automated support systems 134 can unpack the semantic meaning of the embedding data 144. Alternatively, the analysis model 112 can unpack the semantic meaning from the embedding data 144 and can provide the semantic meaning to the automated support systems 134.

The analysis model 112 can also generate topic distribution data 146 from the embedding data 144. As described previously, the training process pretty analysis model 112 includes training the analysis model 112 to generate topic distribution data based on the embedding data. Accordingly, the analysis model generates topic distribution data 146 for the new user query based on the embedding data 144. The topic distribution data 146 indicates, for each of a plurality of topics, have relevant the new user query is to that topic. Accordingly, the topic distribution data 146 provides an indication of the topics that are most relevant to the new user query. The analysis model 112 can provide the topic distribution data 146 to the automated support systems 134.

The automated support systems 134 generate support data 150 based on the semantic meaning of the user query in accordance with the embedding data 144 and/or the topic distribution data 146. The support data 150 includes information that is relevant to the new user query data 148. Because the analysis model 112 has been trained to accurately understand the semantic meaning of the new user query data, the support data 150 chosen by the automated support systems 134 is likely to accurately answer the question or resolve the concern provided by the user in the new user query data 148.

The support data 150 can include one or more assistance documents selected from the assistance document database 120 based on the semantic meaning of the new user query data 148. The user can then read the assistance documents. Because the assistance documents were selected based on the semantic meaning of the new user query data 148, the assistance documents are likely to provide helpful information that answers the question or resolve the concern of the user.

The support data 150 can include relevant portions of selected assistance documents. The support data 150 can also include summaries of selected assistance documents. The users can read the summaries of the selected assistance documents they can select one or more assistance documents to read.

The automated support systems 134 can include support bots. The support checkbox can provide support data 150 in the form of a dialogue or conversation with the user. The dialogue or conversation can include text selected to answer the user's question or concern. The dialogue provided by the automated support systems 134 can include portions of assistance documents from the assistance documents database 102. The dialogue can also include textile material selected from other databases.

In one embodiment, the embedding data 144 can be provided to other machine learning models in order to unpack the semantic meaning of the embedding matrix. In one example, the machine learning models can classify a customer support ticket based on the embedding data. This machine learning models can be utilized to provide supervised or unsupervised clustering of customer support calls, to provide a basis for chat bot natural language understanding, to facilitate semantic search, or to provide textual input features for a recommendation system.

As described previously, the assistance document database 102 includes a plurality of assistance documents. Each assistance document is related to a particular aspect of the data management system about which users have previously asked questions. The assistance documents include solutions to problems, or explanations about aspects of the data management system 100. Users can search for answers among the assistance documents in the assistance document database 102.

The assistance document database 102 can include assistance documents generated by experts associated with the data management system 100. Experts may receive questions from users and may generate an assistance document including the answer or explanation for the user's question. The expert may provide the assistance document to the user that asks a question, while also storing the assistance document in the assistance document database 102 for future reference by other users of the data management system 100.

The assistance document database 102 can include a social question-and-answer database. In a social question-and-answer database, each assistance document corresponds to a question or query provided by a user of the data management system 100. In the social question and answer database, the assistance documents include answers or solutions to a query made by a user that are provided by other users of the data management system 100.

The data management system 100 includes computing resources 136. The computing resources 136 include processing resources 152 and memory resources 154. The processing resources 152 include one or more processors. The memory resources 154 include one or more memories configured as computer readable media capable of storing software instructions and other data. The processing resources 152 are capable of executing software instructions stored on the computer readable media. In one embodiment, the various components, modules, databases, and engines of the data management system utilize the computing resources 136 to assist in performing their various functions. Alternatively, or additionally, the various components, modules, databases, and engines can utilize other computing resources.

Figure 3:
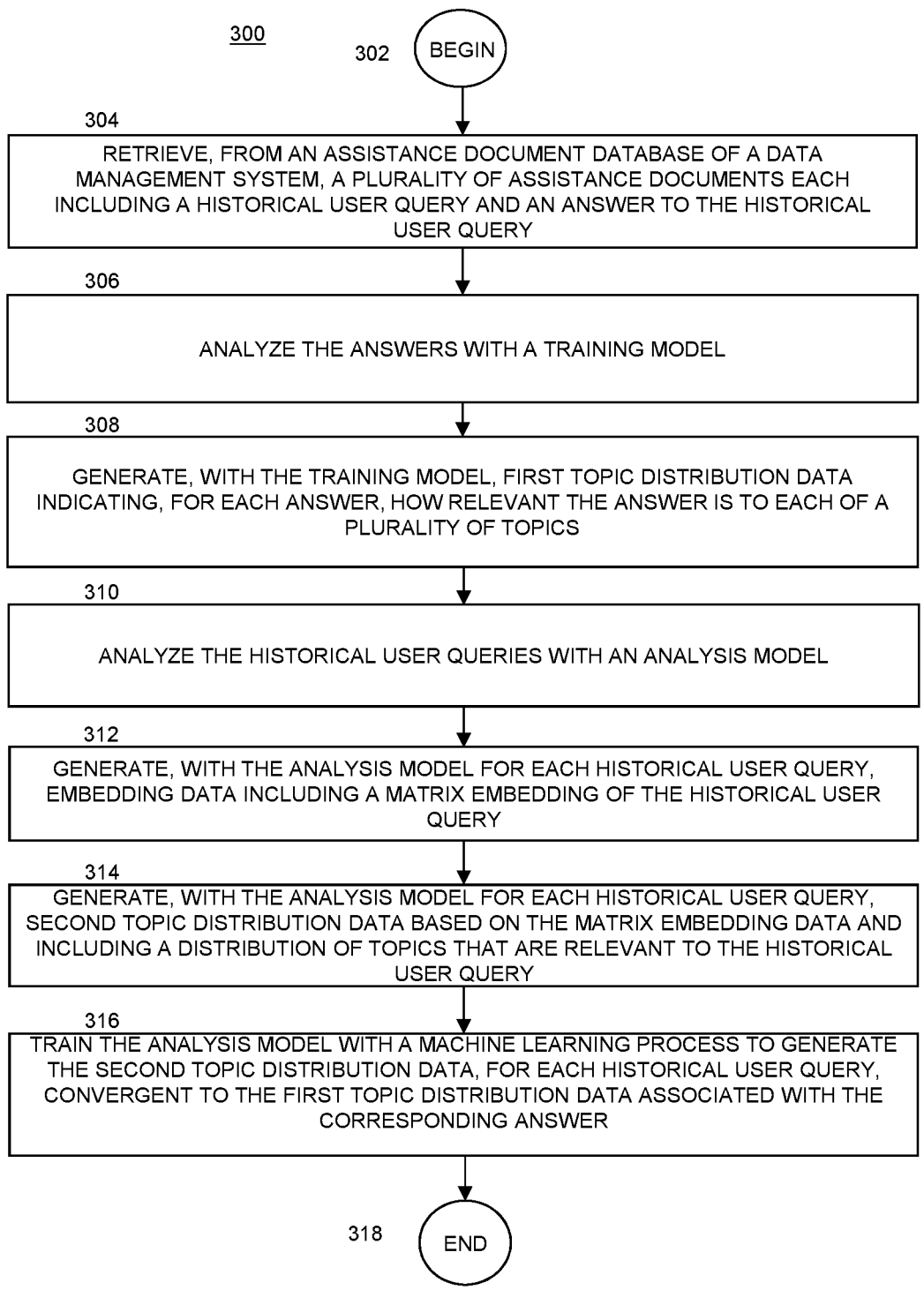
FIG. 3 illustrates a flow diagram of a process for understanding the semantic meaning of user queries, according to an embodiment.

FIG. 3 illustrates a flow diagram of a process 300 for understanding user queries, in various embodiments.

Referring to FIG. 3, FIGS. 1-2, and the description of FIGS. 1-2 above, in one embodiment, process 300 begins at BEGIN 302 and process flow proceeds to 304.

At 304, a plurality of assistance documents each including a historical user query and an answer to the historical user query is retrieved from an assistance document database of a data management system, using any of the methods, processes, and procedures discussed above with respect to FIGS. 1-2. From block 304 process flow proceeds to 306.

At 306, the answers are analyzed with a training model, using any of the methods, processes, and procedures discussed above with respect to FIGS. 1-2. From 306 process flow proceeds to 308.

At 308, first topic distribution data is generated with a training model indicating, for each answer, how relevant the answer is to each of a plurality of topics, using any of the methods, processes, and procedures discussed above with respect to FIGS. 1-2. From 308, process flow proceeds to 310.

At 310, the historical user queries are analyzed with an analysis model, using any of the methods, processes, and procedures discussed above with respect to FIGS. 1-2. From 310 process flow proceeds to 312.

At 312, embedding data is generated, with the analysis model for each historical user query, including a matrix embedding of the historical user query, using any of the methods, processes, and procedures discussed above with respect to FIGS. 1-2. From 312, process flow proceeds to 314.

At 314, second topic distribution data is generated, with the analysis model for each historical user query, based on the matrix embedding data and including a distribution of topics that are relevant to the historical user query, using any of the methods, processes, and procedures discussed above with respect to FIGS. 1-2. From 314 process flow proceeds to 316.

At 316, the analysis model is trained with a machine learning process to generate the second topic distribution data, for each historical user query, convergent to the first topic distribution data associated with the corresponding answer, using any of the methods, processes, and procedures discussed above with respect to FIGS. 1-2. From 316 process flow proceeds to 318.

At 318 the process 300 for understanding user queries is exited to await new data and/or instructions.

Figure 4:
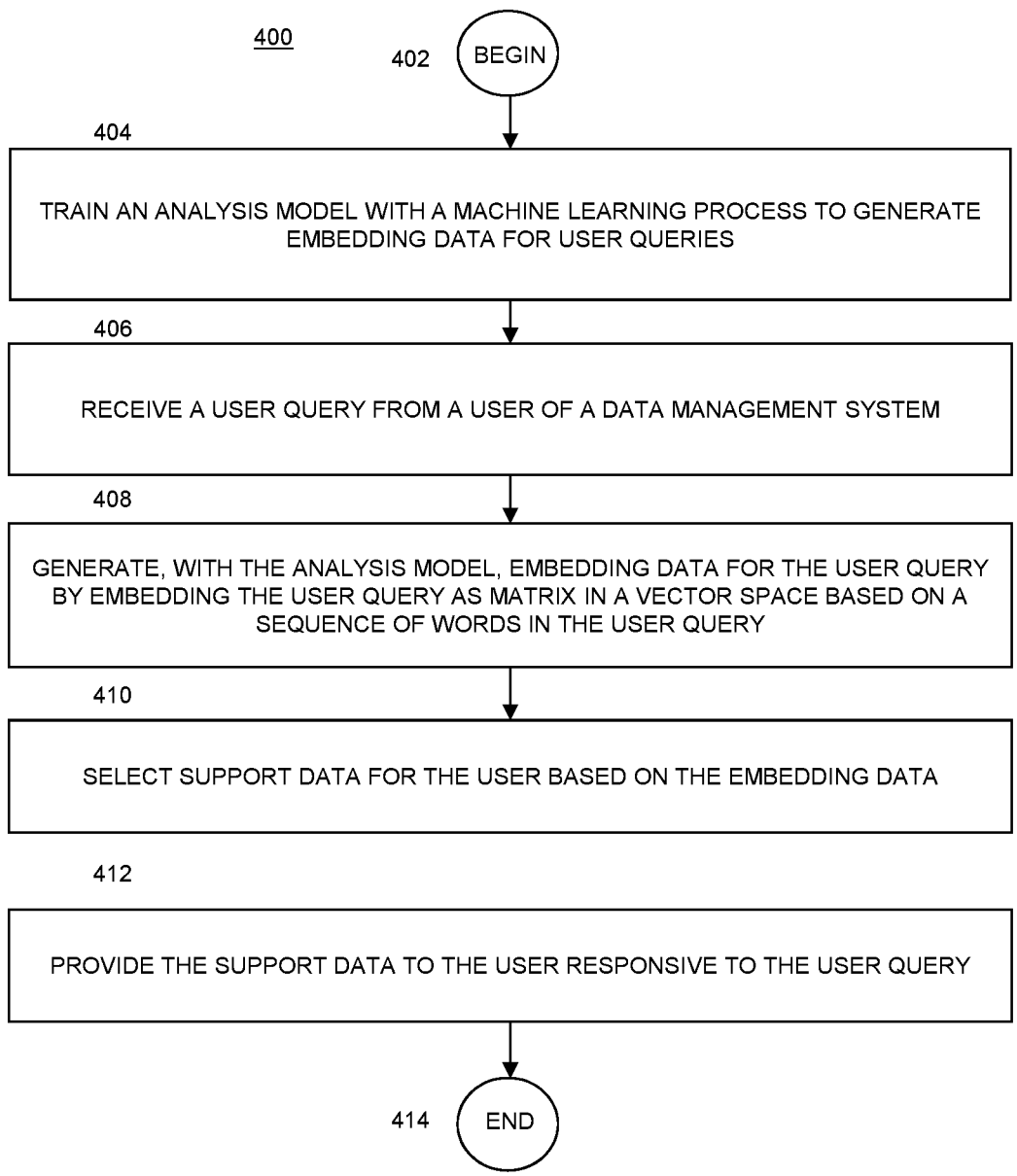
FIG. 4 illustrates a flow diagram of a process for understanding the semantic meaning of user queries, according to an embodiment.

FIG. 4 illustrates a flow diagram of a process 400 for understanding user queries, in various embodiments.

Referring to FIG. 4, FIGS. 1-2, and the description of FIGS. 1-2 above, the process 400 begins at 402. From 402 process flow proceeds to 404.

At 404 an analysis model is trained with a machine learning process to generate embedding data for user queries, using any of the methods, processes, and procedures discussed above with respect to FIGS. 1-2. From block 404 process flow proceeds to block 406.

At 406 a user query is received from a user of a data management system, using any of the methods, processes, and procedures discussed above with respect to FIGS. 1-2. From 406 process flow proceeds to 408.

At 408 embedding data is generated, with the analysis model, for the user query by embedding the user query as matrix in a vector space based on a sequence of words in the user query, using any of the methods, processes, and procedures discussed above with respect to FIGS. 1-2. From 408 process flow proceeds to 410. From 408 process flow proceeds to 410.

At 410 support data is selected for the user based on the embedding data, using any of the methods, processes, and procedures discussed above with respect to FIGS. 1-2. From 410 process flow proceeds to 412.

At 412 the support data is provided to the user responsive to the user query, using any of the methods, processes, and procedures discussed above with respect to FIGS. 1-2. From 410 process flow proceeds to 414.

At 414 the process 400 for understanding user queries is exited to await new data and/or instructions.

In one embodiment, a method includes retrieving, from an assistance document database of a data management system, a plurality of assistance documents each including a historical user query and an answer to the historical user query and analyzing the answers with a training model. The method includes generating, with the training model, first topic distribution data indicating, for each answer, how relevant each of a plurality of topics is to the answer and analyzing the historical user queries with an analysis model. The method includes generating, with the analysis model for each historical user query, embedding data including a matrix embedding of the historical user query and generating, with the analysis model for each historical user query, second topic distribution data based on the matrix embedding data and including a distribution of topics that are relevant to the historical user query. The method includes training the analysis model with a machine learning process to generate the second topic distribution data, for each historical user query, convergent to the first topic distribution data associated with the corresponding answer.

Understanding user queries based on sequence sensitive embeddings is a technical solution to a long-standing technical problem and is not an abstract idea for at least a few reasons. First, understanding user queries based on sequence sensitive embeddings is not an abstract idea because it is not merely an idea itself (e.g., can be performed mentally or using pen and paper). Second, understanding user queries based on sequence sensitive embeddings is not an abstract idea because it is not a fundamental economic practice (e.g., is not merely creating a contractual relationship, hedging, mitigating a settlement risk, etc.). Third, understanding user queries based on sequence sensitive embeddings is not an abstract idea because it is not a method of organizing human activity (e.g., managing a game of bingo). Fourth, although mathematics may be used in an analysis process the disclosed and claimed methods and systems of understanding user queries based on sequence sensitive embeddings are not an abstract idea because the methods and systems are not simply a mathematical relationship/formula.

Understanding user queries based on sequence sensitive embeddings yields significant improvement to the technical fields of electronic data management, user support, and data processing, according to one embodiment. The present disclosure adds significantly to the field of electronic data management because understanding user queries based on sequence sensitive embeddings increases the efficiency and accuracy with which data management systems can provide data management services to users.

As noted above, the specific examples discussed above are but illustrative examples of implementations of embodiments of the method or process understanding user queries based on sequence sensitive embeddings. Those of skill in the art will readily recognize that other implementations and embodiments are possible. Therefore, the discussion above should not be construed as a limitation on the claims provided below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method performed by one or more processors of a system and comprising:

retrieving, from an assistance document database of a data management system, a plurality of assistance documents each including a user query and an answer to the user query;

generating, using a training model, first topic distribution data indicating, for each respective answer, how relevant each of a plurality of topics is to the respective answer based on text in the respective answer;

generating, using an analysis model, and for each respective user query, a matrix embedding indicative of a semantic meaning of the respective user query;

generating, using the analysis model, and for each respective user query, second topic distribution data based on the matrix embedding generated for the respective user query, the second topic distribution data including a distribution of topics deemed relevant to the respective user query based on text in corresponding answers;

generating model training data including the user queries and the distributions of topics, and not including the answers; and training the analysis model, using the model training data in conjunction with a machine learning process, to generate, for a given query, a distribution of topics deemed relevant to the given query based on text in the given query.

2. The method of claim 1, wherein the training model includes a latent Dirichlet allocation model.

3. The method of claim 2, wherein each answer is modeled as a bag of words.

4. The method of claim 3, wherein each of the plurality of topics is modeled as a distribution over words.

5. The method of claim 4, wherein the training model generates the first topic distribution data based on cooccurrence of words in the answers.

6. The method of claim 1, wherein the analysis model is sensitive to sequences of words in user queries.

7. The method of claim 6, wherein the analysis model includes a sequential neural model.

8. The method of claim 7, wherein the sequential neural model includes one or more of a long short-term memory model, a gated recurrent unit model, or a convolution neural network.

9. The method of claim 6, further comprising:
converting each respective user query to a series of vectors in which each vector is a one hot encoding of one of the words in the respective user query, wherein the matrix embedding for the respective user query is generated further based on the corresponding series of vectors.

10. The method of claim 1, wherein the machine learning process is a semi-supervised machine learning process in which the first topic distribution data is used as labels for the semi-supervised machine learning process.

11. The method of claim 1, further comprising, after the training:
receiving a new user query from a user of the data management system;
generating a matrix embedding for the new user query;
selecting support data for the new user query based on the matrix embedding, the support data deemed most likely to accurately answer or resolve the new user query; and
providing the support data to the user in response to the new user query.

12. The method of claim 11, wherein the support data is provided to the user via an automated support system of the data management system.

13. The method of claim 12, wherein the automated support system includes at least one of an assistance document search function or a support chat bot.

14. A system comprising:
one or more processors; and
at least one memory coupled to the one or more processors and storing instructions that, when executed by the one or more processors, cause the system to perform operations including:
retrieving, from an assistance document database of a data management system, a plurality of assistance documents each including a user query and an answer to the user query;
generating, using a training model, first topic distribution data indicating, for each respective answer, how relevant each of a plurality of topics is to the respective answer based on text in the respective answer;
generating, using an analysis model, and for each respective user query, a matrix embedding indicative of a semantic meaning of the respective user query;
generating, using the analysis model, and for each respective user query, second topic distribution data based on the matrix embedding generated for the respective user query, the second topic distribution data including a distribution of topics deemed relevant to the respective user query based on text in corresponding answers;
generating model training data including the user queries and the distributions of topics, and not including the answers; and
training the analysis model, using the model training data in conjunction with a machine learning process, to generate, for a given query, a distribution of topics deemed relevant to the given query based on text in the given query.

15. The system of claim 14, wherein:
the training model includes a latent Dirichlet allocation model;
each answer is modeled as a bag of words;
each of the plurality of topics is modeled as a distribution over word; and
the training model generates the first topic distribution data based on cooccurrence of words in the answers.

16. The system of claim 14, wherein:
the analysis model is sensitive to sequences of words in user queries;
the analysis model includes a sequential neural model; and
the sequential neural model includes at least of a long short-term memory model, a gated recurrent unit model, or a convolution neural network.

17. The system of claim 14, wherein the analysis model is sensitive to sequences of words in user queries, and wherein execution of the instructions causes the system to perform operations further including:
converting each respective user query to a series of vectors in which each vector is a one hot encoding of one of the words in the respective user query, wherein the matrix embedding for the respective user query is generated further based on the corresponding series of vectors.

18. The system of claim 14, wherein the machine learning process is a semi-supervised machine learning process in which the first topic distribution data is used as labels for the semi-supervised machine learning process.

19. A method performed by one or more processors of a system and comprising:
receiving a user query;
generating, using an analysis model trained with training data generated using other user queries and distributions of topics generated for the other user queries, and not using answers to the other user queries, a matrix embedding for the user query;
selecting support data for the user query based on the matrix embedding, the support data deemed by the trained analysis model as most likely to accurately answer or resolve the user query; and
providing the support data to a user in response to the user query.

20. The method of claim 19, wherein the support data is provided to the user via an automated support system, and wherein the automated support system includes at least one of an assistance document search function or a support chat bot.

* * * * *